United States Patent
Kim et al.

(10) Patent No.: US 7,294,176 B2
(45) Date of Patent: Nov. 13, 2007

(54) SURFACE DISCHARGE TYPE AIR CLEANING DEVICE

(75) Inventors: Ho Jung Kim, Inchun-si (KR); In Ho Choi, Kyungki-do (KR); Kwan Ho Yum, Seoul (KR); Ho Seon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/224,123

(22) Filed: Sep. 13, 2005

(65) Prior Publication Data
US 2006/0056129 A1    Mar. 16, 2006

(30) Foreign Application Priority Data
Sep. 14, 2004   (KR) .................. 10-2004-0073482

(51) Int. Cl.
*B03C 3/40* (2006.01)
(52) U.S. Cl. ............... 96/69; 96/88; 96/97; 96/99
(58) Field of Classification Search ............... 96/69, 96/99, 97, 94, 88; 95/73, 77; 361/225–235; 422/186.04
See application file for complete search history.

(56) References Cited
U.S. PATENT DOCUMENTS

| | | | | |
|---|---|---|---|---|
| 4,944,778 A | * | 7/1990 | Yanagawa | 96/66 |
| 5,055,118 A | * | 10/1991 | Nagoshi et al. | 96/88 |
| 5,290,343 A | * | 3/1994 | Morita et al. | 96/39 |
| 5,474,600 A | * | 12/1995 | Volodina et al. | 96/57 |
| 6,635,106 B2 | * | 10/2003 | Katou et al. | 96/67 |
| 2004/0145853 A1 | * | 7/2004 | Sekoguchi et al. | 361/225 |
| 2006/0070526 A1 | * | 4/2006 | Hong et al. | 96/69 |

FOREIGN PATENT DOCUMENTS

| | | | |
|---|---|---|---|
| CN | 2231251 Y | | 7/1996 |
| CN | 2380555 Y | | 5/2000 |
| JP | 8-217412 A | * | 8/1996 |
| JP | 2002-065838 A | * | 3/2002 |
| JP | 2004-103257 A | * | 4/2004 |
| WO | WO 03/013620 A1 | * | 2/2003 |
| WO | WO 2004/023615 A1 | * | 3/2004 |

* cited by examiner

*Primary Examiner*—Richard L. Chiesa
(74) *Attorney, Agent, or Firm*—Birch, Stewart, Kolasch & Birch, LLP

(57) ABSTRACT

A surface discharge air cleaning device includes an insulating dielectric body, a discharge electrode formed at the upper surface of the insulating dielectric body, and a ground electrode formed at the lower surface of the insulating dielectric body, the discharge electrode being formed of a closed pattern and at least one non-pattern part, at which the electrode is not formed being disposed in the closed pattern, therefore a uniform and stable plasma formation is accomplished, and the number of hydroxyl radicals and negative ions is increased while the amount of ozone is decreased.

20 Claims, 7 Drawing Sheets

SURFACE DISCHARGE TYPE AIR CLEANING DEVICE

BACKGROUND OF THE INVENTION

1. Field of the Invention

The present invention relates to a surface discharge type air cleaning device mounted in an air conditioner for cleaning air, and, more particularly, to a surface discharge type air cleaning device that is capable of increasing generation of negative ions and hydroxyl (OH) radicals while decreasing generation of ozone, which is toxic to humans, thereby improving noxious gas sterilizing efficiency and air cleaning efficiency.

2. Description of the Related Art

Generally, a surface discharge type air cleaning device adopts a surface discharge plasma chemical processing method. Specifically, the surface discharge type air cleaning device is a ceramic-based high frequency discharge type air cleaning device that is capable of generating a large number of hydroxyl radicals and a large amount of ozone through the formation of a strong plasma area on the surface of an element and processing noxious gases through the use of the generated hydroxyl radicals and ozone.

FIG. 1 is a plan view showing a conventional surface discharge type air cleaning device, and FIG. 2 is a cross-sectional view of the conventional surface discharge type air cleaning device seen from line A-A of FIG. 1.

As shown in FIGS. 1 and 2, the conventional surface discharge type air cleaning device comprises: an insulating dielectric body 10, which is composed of two rectangular sheets attached to each other while being disposed in surface contact with each other; a discharge electrode 12 disposed on the upper surface of the insulating dielectric body 10; and a ground electrode 14 disposed between the two rectangular sheets of the insulating dielectric body 10. On the upper surface of the insulating dielectric body 10 is applied a coating layer 16 for covering the discharge electrode 12 such that the discharge electrode 12 is not directly exposed to the atmosphere.

Generally, the insulating dielectric body 10 is made of a ceramic material. The discharge electrode 12 is connected to one terminal of a power source supply unit, and the ground electrode 14 is connected to the other terminal of the power source supply unit, such that the power source is supplied to not only the discharge electrode 12 but also the ground electrode 14. An alternating current power source is used as the power source.

The discharge electrode 12 comprises: three main electrodes 12a, which are arranged in parallel with one another; and subsidiary electrodes 12b protruding from the main electrodes 12a, each of the subsidiary electrodes 12b having a pointed end. The ground electrode 14 comprises: two branched ground electrodes 14a, which are arranged in parallel with each other and disposed opposite to the subsidiary electrodes 12b.

When a power source having a voltage higher than onset voltage is applied to the discharge electrode 12 and the ground electrode 14 of the conventional surface discharge type air cleaning device with the above-stated construction, a dielectric breakdown phenomenon occurs between the discharge electrode 12 and the ground electrode 14. As a result, a discharge phenomenon occurs on the surface of the insulating dielectric body 10, as shown in FIG. 3, and therefore, a strong plasma area is formed on the surface of the insulating dielectric body 10.

When the plasma is discharged as described above, a conductive path, which is called a streamer, is formed on the surface of the insulating dielectric body 10, and a large number of high-energy electrons are generated through the streamer. The high-energy electrons react with gases surrounding the high-energy electrons due to electron collision. As a result, a large amount of ozone and a large number of hydroxyl radicals and negative ions are generated.

The generated ozone, hydroxyl radicals, and negative ions oxidize and decompose pollutants, such as noxious gases contained in air, to clean the air.

As described above, the conventional surface discharge type air cleaning device performs discharge through the entire surface of the insulating dielectric body 10, and therefore, the onset voltage of the conventional surface discharge type air cleaning device is lower than that of a corona discharge type air cleaning device. Consequently, power consumption is low, and noise generated from the conventional surface discharge type air cleaning device is small, and therefore, air is efficiently cleaned by the conventional surface discharge type air cleaning device even when the conventional surface discharge type air cleaning device is used in a small space.

In the conventional surface discharge type air cleaning device, however, the discharge electrode 12 is disposed on the upper surface of the insulating dielectric body 10, i.e., the pattern of the discharge electrode 12 is formed on the upper surface of the insulating dielectric body 10 in an embossed structure. As a result, there is a limit in lowering the onset voltage and input energy necessary to cause discharge. Consequently, the number of hydroxyl radicals and negative ions, which are generated when the voltage is low, is decreased, and the amount of ozone, which is toxic to humans, is increased. In addition, power consumption is increased.

Specifically, electrical charge concentration is increased at the end part E of the discharge electrode 12, as shown in FIG. 3. Consequently, it is required that the onset voltage and the input energy be raised in order to accomplish uniform generation distribution of streamer throughout the entire region of the dielectric body. Especially, thermal stress is partially increased at the end part E of the discharge electrode 12, and therefore, gases surrounding the discharge electrode 12 are heated. As a result, the amount of ozone generated is increased. On the other hand, the number of hydroxyl radicals and negative ions is decreased. Also, partial deterioration of the electrode occurs rapidly due to partial increase of thermal stress, and therefore, the service life of the surface discharge type air cleaning device is shortened, and discharge safety is also lowered. Consequently, air cleaning efficiency is decreased.

Furthermore, the insulating dielectric body 10 of the conventional surface discharge type air cleaning device is composed of two sheets, between which the ground electrode 14 is disposed. Consequently, the structure of the conventional surface discharge type air cleaning device is complicated, and therefore, manufacturing costs of the conventional surface discharge type air cleaning device are increased.

SUMMARY OF THE INVENTION

Therefore, the present invention has been made in view of the above problems, and it is an object of the present invention to provide a surface discharge type air cleaning device having a discharge electrode whose pattern is formed in a depressed structure to lower onset voltage and input energy and to accomplish entirely uniform and stable plasma formation, thereby increasing the generated number of hydroxyl radicals and negative ions, which sterilize and decompose noxious gases, while decreasing the generated amount of ozone, which is toxic to humans, preventing decrease of the service life of the surface discharge type air cleaning device due to partial deterioration of the discharge electrode, and reducing power consumption.

In accordance with the present invention, the above and other objects can be accomplished by the provision of a surface discharge type air cleaning device comprising: an insulating dielectric body formed in the shape of a sheet; a discharge electrode formed at the upper surface of the insulating dielectric body; and a ground electrode formed at the lower surface of the insulating dielectric body, wherein the discharge electrode is formed of a closed pattern having a predetermined area on the upper surface of the insulating dielectric body, and the discharge electrode has at least one non-pattern part disposed in a part where the pattern is formed, the electrode being not formed at the at least one non-pattern part.

Preferably, the pattern of the discharge electrode is formed in the shape of a rectangular frame, and the ground electrode is formed of a single rectangular pattern.

Preferably, the frame area of the pattern of the discharge electrode is greater than that of the pattern of the ground electrode.

Preferably, the at least one non-pattern part comprises a plurality of non-pattern parts extending in the longitudinal direction of the pattern of the discharge electrode while being arranged in parallel with one another. Each of the non-pattern parts comprises: a linear part extending in the longitudinal direction of the pattern of the discharge electrode; and a plurality of circular parts formed on the linear part at a predetermined interval, the diameter of each of the circular parts being greater than the width of the linear part.

Preferably, the discharge electrode has a plurality of pointed ends, which are protruded from opposite sides of the pattern part about the non-pattern part toward each other, and the pointed ends are formed in the shape of a triangle and uniformly protruded at a predetermined interval.

Preferably, the air cleaning device further comprises: protective films applied to the upper and lower surfaces of the insulating dielectric body for protecting the discharge electrode and the ground electrode, respectively, and the discharge electrode and the ground electrode are provided with terminal parts, which are exposed outside the protective films and connected to an external circuit, respectively.

According to the present invention, the pattern of the discharge electrode is formed in the depressed structure. Consequently, it is possible to lower onset voltage and input energy and to accomplish entirely uniform and stable plasma formation, and therefore, the generated number of hydroxyl radicals and negative ions, which sterilize and decompose noxious gases, is increased while the generated amount of ozone, which is toxic to humans, is decreased, and power consumption is reduced.

Since entirely uniform and stable plasma formation is accomplished, decrease of the service life of the surface discharge type air cleaning device due to partial deterioration of the discharge electrode is prevented, and discharge safety is increased. Consequently, air cleaning efficiency is improved.

Furthermore, the discharge electrode and the ground electrode are formed on the upper and lower surfaces of the insulating dielectric body, which is composed of a single sheet. Consequently, the structure of the surface discharge type air cleaning device is simplified, and manufacturing costs of the surface discharge type air cleaning device are reduced.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

It should be understood that surface discharge type air cleaning devices according to numerous preferred embodiments of the present invention may be proposed, although only the most preferred embodiments of the present invention will be described hereinafter. Also, the basic structure of the surface discharge type air cleaning device according to the present invention is identical to that of the above-described conventional surface discharge type air cleaning device, and therefore, a detailed description thereof will not be given.

Figure 4:
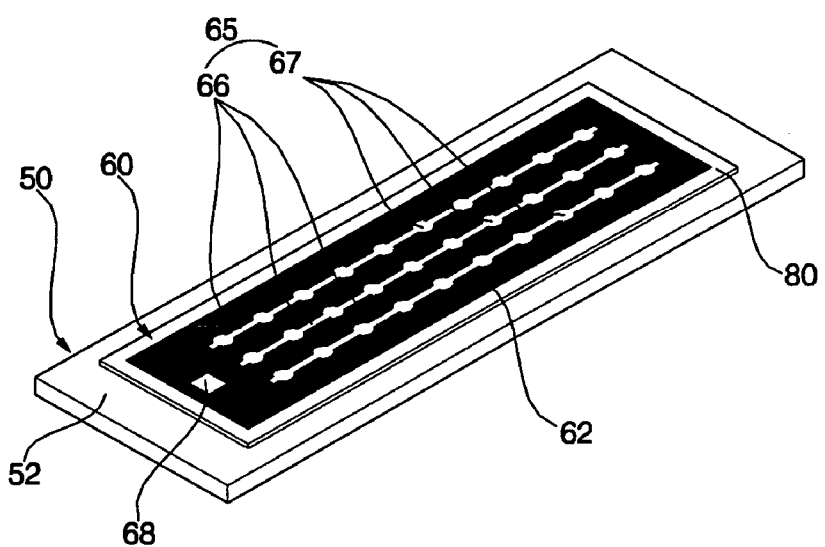
FIG. 4 is a perspective view of a surface discharge type air cleaning device according to a first preferred embodiment of the present invention showing the upper surface of the surface discharge type air cleaning device.
Figure 5:
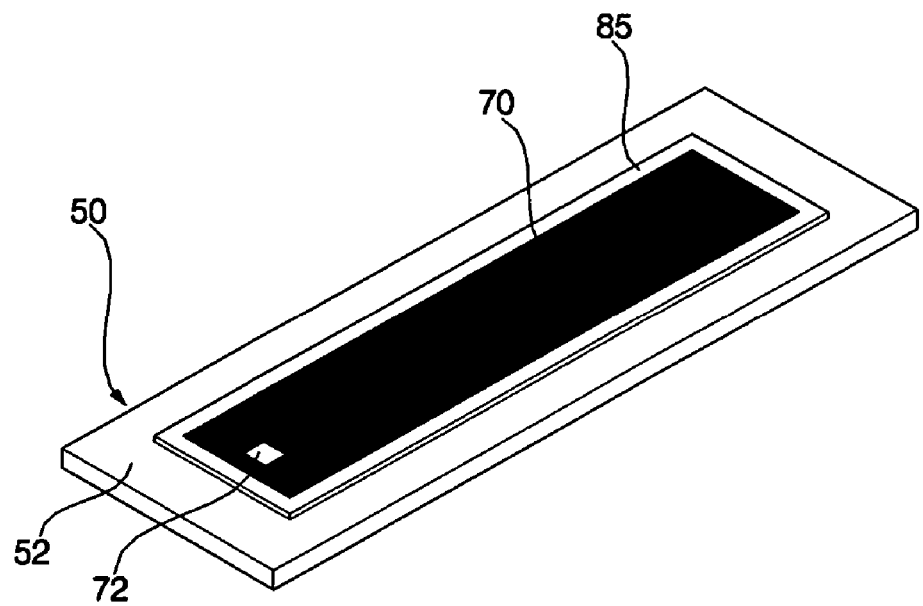
FIG. 5 is a perspective view of the surface discharge type air cleaning device according to the first preferred embodiment of the present invention showing the lower surface of the surface discharge type air cleaning device.
Figure 6:
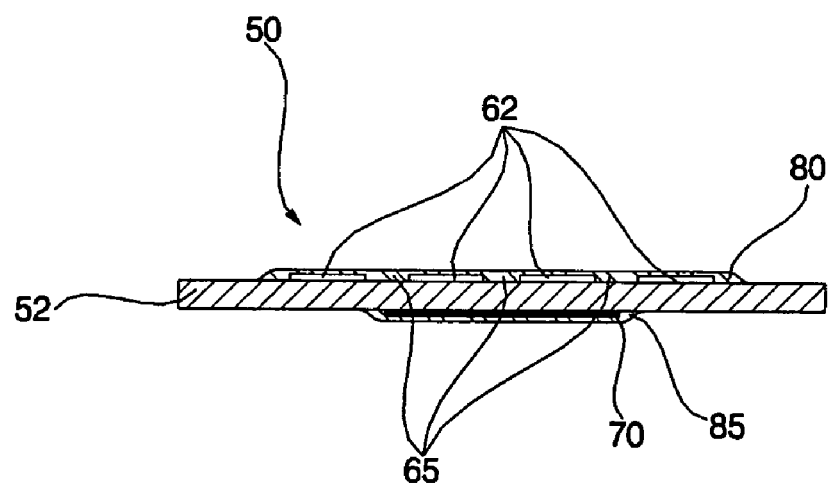
FIG. 6 is a cross-sectional view of the surface discharge type air cleaning device according to the first preferred embodiment of the present invention.

A surface discharge type air cleaning device 50 according to a first preferred embodiment of the present invention is shown in FIGS. 4 to 6. FIG. 4 is a perspective view of the surface discharge type air cleaning device 50 according to the first preferred embodiment of the present invention showing the upper surface of the surface discharge type air cleaning device 50, FIG. 5 is a perspective view of the surface discharge type air cleaning device 50 according to the first preferred embodiment of the present invention showing the lower surface of the surface discharge type air cleaning device 50, and FIG. 6 is a cross-sectional view of the surface discharge type air cleaning device 50 according to the first preferred embodiment of the present invention.

As shown in FIGS. 4 to 6, the surface discharge type air cleaning device 50 according to the first preferred embodiment of the present invention comprises: an insulating dielectric body 52; a discharge electrode 60 formed at the upper surface of the insulating dielectric body 52; and a ground electrode 70 formed at the lower surface of the insulating dielectric body 52. The discharge electrode 60 and the ground electrode 70 are protected by protective films 80 and 85 coated on the upper and lower surfaces of the insulating dielectric body 52.

The insulating dielectric body 52 is composed of a single rectangular sheet having a predetermined thickness, which is distinguished from the insulating dielectric body of the conventional surface discharge type air cleaning device as described above. Preferably, the insulating dielectric body 52 is made of a resin material having high oxidization resistance for organic matter or a ceramic material for inorganic matter. However, the material of the insulating dielectric body 52 is not limited to the resin material or the ceramic material, and the shape of the insulating dielectric body 52 is not limited to the rectangular shape. The insulating dielectric body 52 may be formed of various materials and shapes according to the design conditions of the insulating dielectric body 52.

The discharge electrode 60 is formed of a pattern of a conductive metallic material printed on the upper surface of the insulating dielectric body 52. The pattern is formed in a rectangular closed structure having a predetermined area.

Figure 1:
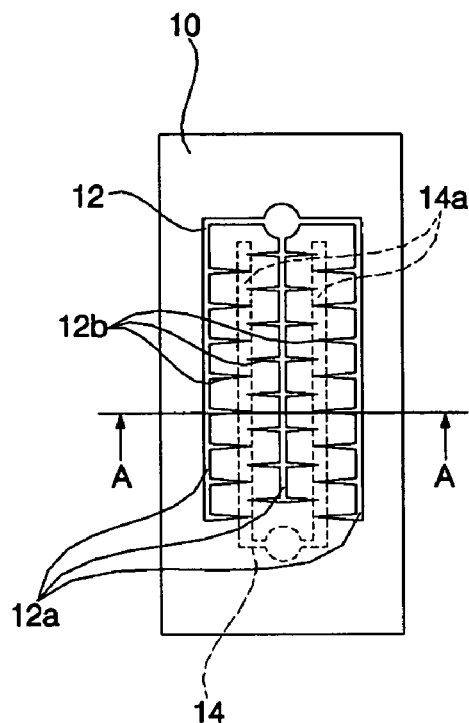
FIG. 1 is a plan view showing a conventional surface discharge type air cleaning device.
Figure 2:
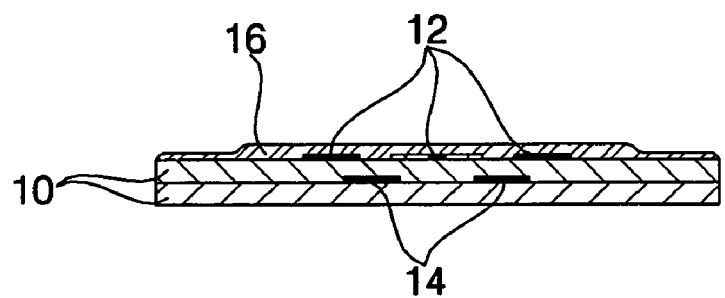
FIG. 2 is a cross-sectional view of the conventional surface discharge type air cleaning device seen from line A-A of FIG. 1.
Figure 3:
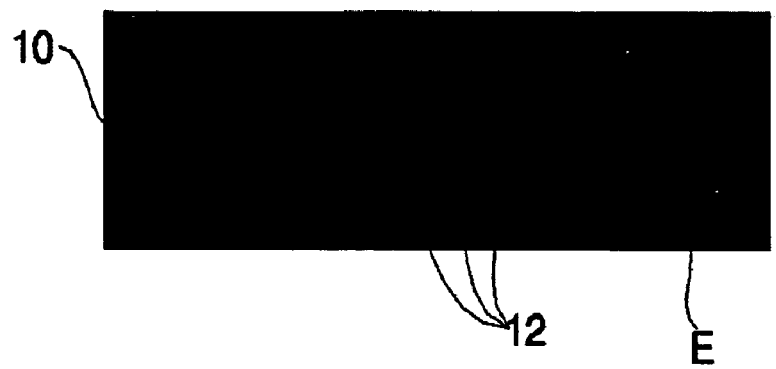
FIG. 3 is a reference view illustrating plasma discharge of the conventional surface discharge type air cleaning device.

It should be noted that the discharge electrode 60 is formed in a depressed structure, which is distinguished from the embossed structure of the discharge electrode 60 of the conventional surface discharge type air cleaning device as shown in FIG. 1. In the depressed structure, relatively low input energy can be used.

Specifically, the discharge electrode 60 has a plurality of non-pattern parts 65 disposed in the part where the pattern is formed (hereinafter, referred to as a "pattern part"). The electrode is not formed at the non-pattern parts 65. The non-pattern parts 65 extend in the longitudinal direction of the pattern of the discharge electrode 60 while being arranged in parallel with one another. Consequently, the non-pattern parts 65 are formed in a closed structure surrounded by the pattern part 62. In the illustrated embodiment, the number of the non-pattern parts 65 is three, although the number of the non-pattern parts 65 may be changed.

Each of the non-pattern parts 65 comprises: a linear part 66 extending in the longitudinal direction of the pattern of the discharge electrode 60; and a plurality of circular parts 67 formed on the linear part 66 at a predetermined interval, the diameter of each of the circular parts 67 being greater than the width of the linear part 66. Preferably, the width of the linear part 66 is less than that of the pattern part 62 at opposite sides of the linear part 66.

The ground electrode 70 is formed of a pattern of a conductive metallic material printed on the lower surface of the insulating dielectric body 52 in the same fashion as the discharge electrode 60. Preferably, the ground electrode 70 is a single rectangular pattern having a size less than that of the discharge electrode 60.

The protective films 80 and 85 are made of a non-conductive material. Preferably, the protective films 80 and 85 are made of a material that is not easily deteriorated, and thus, not damaged when plasma is discharged through the entire surface of the insulating dielectric body 52. The protective films 80 and 85 are formed in the shape of rectangles having sizes greater than those of the discharge electrode 60 and the ground electrode 70, respectively. The protective films 80 and 85 are applied to the upper and lower surfaces of the insulating dielectric body 52.

The protective films 80 and 85 have partially-opened structures such that the discharge electrode 60 and the ground electrode 70 are provided with terminal parts 68 and 72, which are connected to an external circuit, respectively. Preferably, the power source applied through the terminal part 68 of the discharge electrode 60 and the terminal part 72 of the ground electrode 70 is an alternating current power source.

Now, the operation of the surface discharge type air cleansing device 50 with the above-stated construction according to the first preferred embodiment of the present invention will be described.

Figure 7:
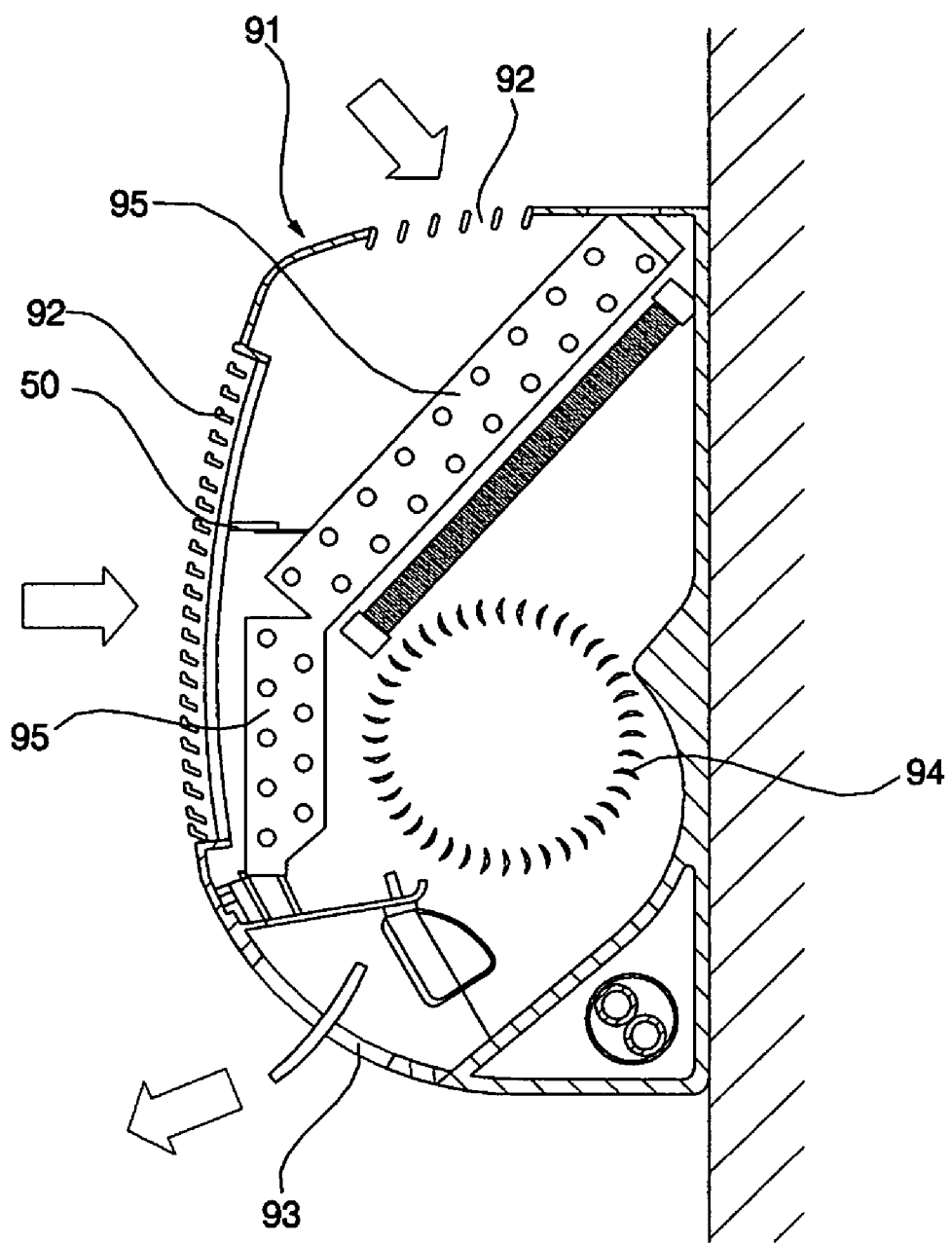
FIG. 7 is a longitudinal sectional view showing an indoor unit of an air conditioner, to which the surface discharge type air cleaning device according to the first preferred embodiment of the present invention is applied.

FIG. 7 is a longitudinal sectional view showing an indoor unit 91 of an air conditioner, to which the surface discharge type air cleaning device 50 according to the first preferred embodiment of the present invention is applied.

Generally, the indoor unit 91 of the air conditioner is provided with an inlet port 92 and an outlet port 93, through which indoor air is circulated. In the indoor unit 91 are mounted a blower 94 for forcibly circulating air and a heat exchanger 95 for performing heat exchange with air passing through the heat exchanger 95.

The surface discharge type air cleaning device 50 according to the first preferred embodiment of the present invention may be disposed at any position on an air channel in the indoor unit. Preferably, the surface discharge type air cleaning device 50 is disposed inside the inlet port 92. The surface discharge type air cleaning device 50 is formed in the shape of a sheet, and therefore, the surface discharge type air cleaning device 50 is preferably disposed in parallel with the air flow direction such that flow resistance is minimized.

In the illustrated embodiment, only one surface discharge type air cleaning device 50 is mounted in the indoor unit 91, although several surface discharge type air cleaning devices may be mounted in the indoor unit 91 if necessary.

The operation of the surface discharge type air cleaning device 50 according to the first preferred embodiment of the present invention will be described hereinafter under the condition that the surface discharge type air cleaning device 50 is mounted in the indoor unit 91 as described above.

When the air conditioner is turned on to operate the blower 94, indoor air is introduced into the indoor unit 91 through the inlet port 92 and passes through the heat exchanger. As a result, the air is cooled, and is then discharged into the interior of a room where the indoor unit 91 is installed. When power source is applied to the surface discharge type air cleaning device 50 to clean the indoor air, some of the air introduced into the indoor unit 91 through the inlet port 92 passes by the surface discharge type air cleaning device 50. As a result, pollutants are sterilized or decomposed, and therefore, the air is cleaned.

Referring to FIGS. 4 to 6, when the air conditioner is operated, and the power source having voltage greater than onset voltage is applied to the discharge electrode 60 and the ground electrode 70, a dielectric breakdown phenomenon occurs between the discharge electrode 60 and the ground electrode 70, and a plasma discharge area is formed on the surface of the insulating dielectric body 52. At this time, a streamer is formed on the surface of the insulating dielectric body 52. As a result, a large number of high-energy electrons are generated through the streamer, and the high-energy electrons react with gases surrounding the high-energy electrons due to electron collision. Consequently, a small amount of ozone and a large number of hydroxyl radicals and negative ions are generated.

The generated ozone, the amount of which is small, and the generated hydroxyl radicals and negative ions, the number of which is large, oxidize and decompose pollutants, such as noxious gases, contained in the indoor air, to clean the air.

Figure 8:
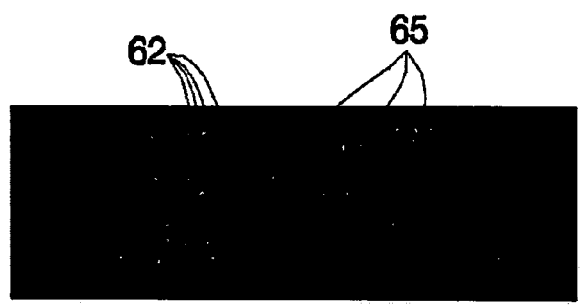
FIG. 8 is a reference view illustrating plasma discharge of the surface discharge type air cleaning device according to the first preferred embodiment of the present invention.

FIG. 8 is a reference view illustrating plasma discharge of the surface discharge type air cleaning device 50 according to the first preferred embodiment of the present invention. The discharge electrode 60 of the surface discharge type air cleaning device 50 according to the first preferred embodiment of the present invention has the pattern part 62, which is formed in the depressed structure. Consequently, electrical charges are uniformly distributed on the entire region of the discharge electrode 60, and therefore, stable plasma formation is possible, and generation distribution of the streamer is also uniformly accomplished.

Since the generation distribution of the streamer is also uniformly accomplished on the surface of the insulating dielectric body 52, partial increase of thermal stress at the discharge electrode 60 is effectively prevented. Consequently, gases surrounding the discharge electrode 60 are not heated, and therefore, generation of ozone, which is toxic to humans, is reduced, and the service life of the surface discharge type air cleaning device is increased.

Figure 9:
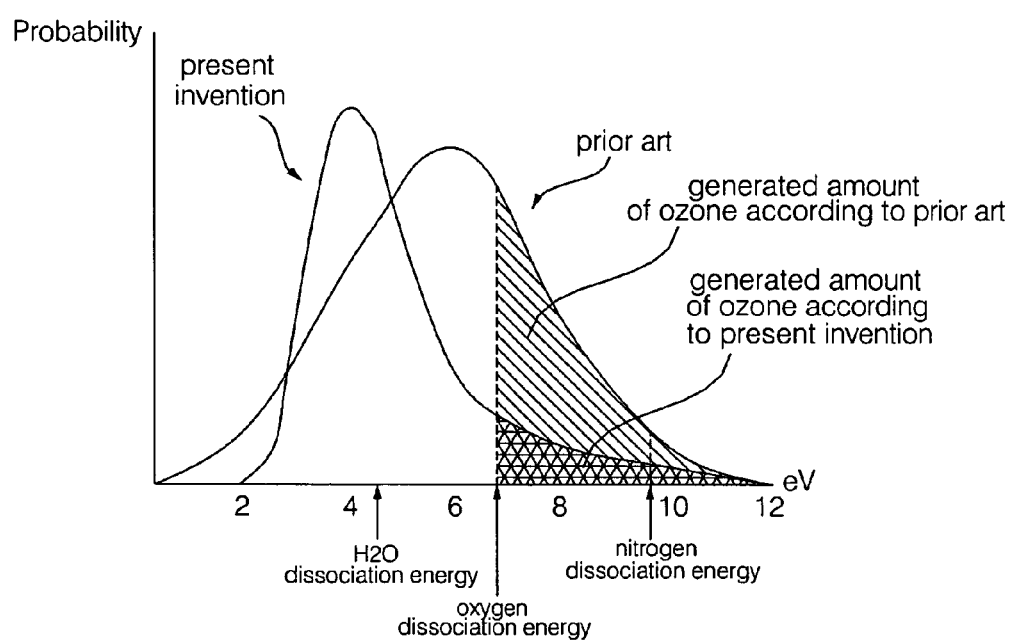
FIG. 9 is a graph illustrating comparison in gaseous energy probability distribution based on applied voltage between the surface discharge type air cleaning device according to the first preferred embodiment of the present invention and the conventional surface discharge type air cleaning device.

FIG. 9 is a graph illustrating comparison in gaseous energy probability distribution based on applied voltage between the surface discharge type air cleaning device 50 according to the first preferred embodiment of the present invention and the conventional surface discharge type air cleaning device. As can be seen from FIG. 9, the surface discharge type air cleaning device 50 can accomplish discharge at lower voltage than the conventional surface discharge type air cleaning device. Consequently, supply of voltage lower than oxygen dissociation energy is possible, and therefore, the generated amount of ozone is minimized. On the other hand, a large number of hydroxyl radicals and negative ions are generated at the low voltage, and therefore, oxidization and decomposition of noxious gases are smoothly carried out.

In conclusion, the surface discharge type air cleaning device 50 according to the first preferred embodiment of the present invention is capable of increasing generation of hydroxyl radicals and negative ions while decreasing generation of ozone, which is toxic to humans, by lowering onset voltage and input energy. Consequently, sterilization and purification of the indoor air are carried out using the hydroxyl radicals and the negative ions. Furthermore, partial increase of thermal stress is effectively prevented, and therefore, the service life of the surface discharge type air cleaning device is increased, and discharge safety is improved.

In the above description, the surface discharge type air cleaning device 50 according to the first preferred embodiment of the present invention is applied to the indoor unit of the air conditioner, although the surface discharge type air cleaning device 50 may be applied to all kinds of equipment, such as various air purifiers or noxious gas purifying apparatuses.

Figure 10:
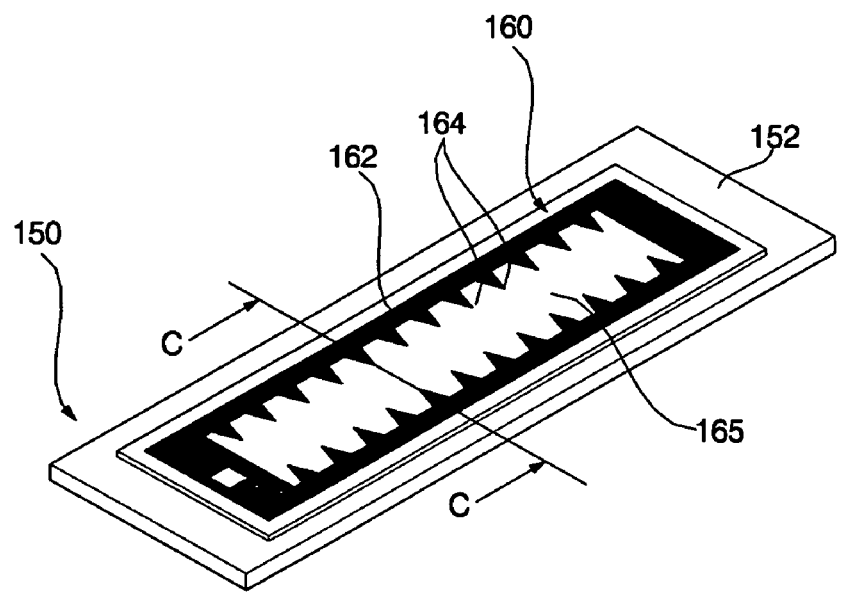
FIG. 10 is a perspective view of a surface discharge type air cleaning device according to a second preferred embodiment of the present invention showing the upper surface of the surface discharge type air cleaning device.
Figure 11:
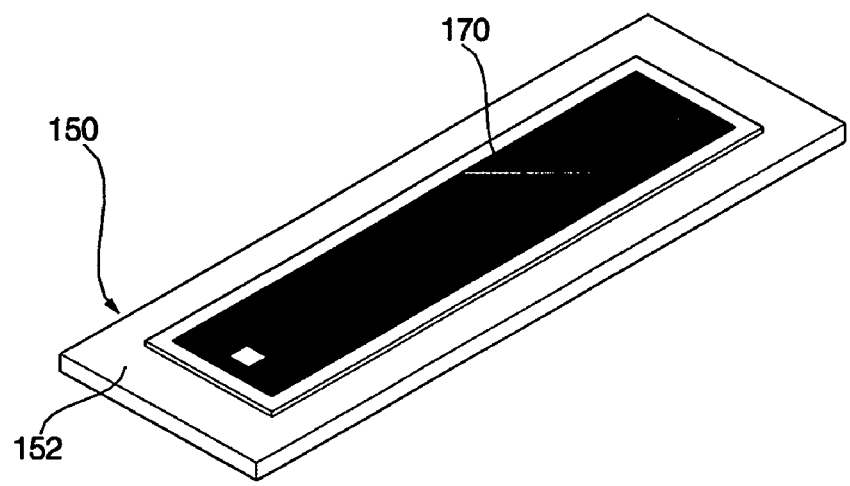
FIG. 11 is a perspective view of the surface discharge type air cleaning device according to the second preferred embodiment of the present invention showing the lower surface of the surface discharge type air cleaning device.
Figure 12:
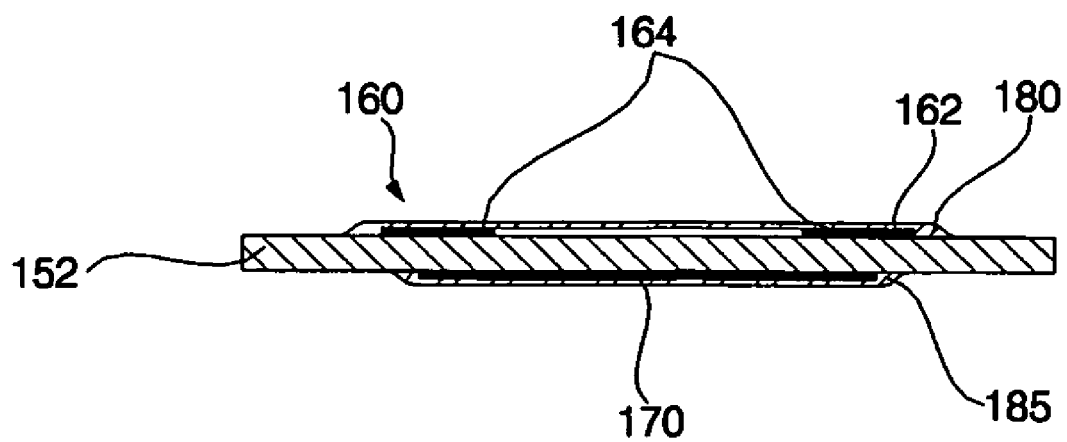
FIG. 12 is a cross-sectional view of the surface discharge type air cleaning device according to the second preferred embodiment of the present invention seen from line A-A of FIG. 10.

A surface discharge type air cleaning device 150 according to a second preferred embodiment of the present invention is shown in FIGS. 10 to 12. FIG. 10 is a perspective view of the surface discharge type air cleaning device 150 according to the second preferred embodiment of the present invention showing the upper surface of the surface discharge type air cleaning device 150, FIG. 11 is a perspective view of the surface discharge type air cleaning device 150 according to the second preferred embodiment of the present invention showing the lower surface of the surface discharge type air cleaning device 150, and FIG. 12 is a cross-sectional view of the surface discharge type air cleaning device 150 according to the second preferred embodiment of the present invention seen from line A-A of FIG. 10.

As shown in FIGS. 10 to 12, the surface discharge type air cleaning device 150 according to the second preferred embodiment of the present invention is characterized by a discharge electrode 160 formed of a rectangular frame-structured pattern part 162 having a non-pattern part 165 formed therein.

Specifically, the pattern part 162 of the discharge electrode 160 is formed in the shape of a rectangular frame, which extends in the longitudinal direction of an insulating dielectric body 152. The non-pattern part 165, which is formed in the pattern part 162, also extends in the longitudinal direction.

Especially, the discharge electrode 160 has a plurality of pointed ends 164, which are protruded from the inner edges of opposite sides of the pattern part 162 about the non-pattern part 165 toward each other.

The pointed ends 164 are formed in the shape of a triangle and are uniformly protruded at a predetermined interval such that electrical charges are concentrated on the pointed ends 164 due to high voltage, and therefore, discharge is smoothly accomplished.

In the surface discharge type air cleaning device 150 with the above-stated construction according to the second preferred embodiment of the present invention, surface discharge is carried out in the depressed pattern structure, and therefore, voltage applied to generate plasma is lowered, and more stable plasma formation is possible. Especially, discharge is carried out at low voltage. Consequently, generation of hydroxyl radicals and negative ions is increased while generation of ozone, which is toxic to humans, is decreased, and sterilization and purification of the air are carried out using the generated hydroxyl radicals and the negative ions.

Other components of the surface discharge type air cleaning device 150 according to the second preferred embodiment of the present invention are identical in construction to those of the surface discharge type air cleaning device 50 according to the first preferred embodiment of the present invention, and the surface discharge type air cleaning device 150 according to the second preferred embodiment of the present invention is applied to the air conditioner in the same fashion as the surface discharge type air cleaning device 50 according to the first preferred embodiment of the present invention. Consequently, a detailed description of the other components of the surface discharge type air cleaning device 150 according to the second preferred embodiment of the present invention will not be given.

As apparent from the above description, the surface discharge type air cleaning device according to the present invention has the following effects.

The pattern of the discharge electrode is formed in the depressed structure. Consequently, it is possible to lower onset voltage and input energy and to accomplish entirely uniform and stable plasma formation, and therefore, the generated number of hydroxyl radicals and negative ions, which sterilize and decompose noxious gases, is increased while the generated amount of ozone, which is toxic to humans, is decreased, and power consumption is reduced.

Since entirely uniform and stable plasma formation is accomplished, decrease of the service life of the surface discharge type air cleaning device due to partial deterioration of the discharge electrode is prevented, and discharge safety is increased. Consequently, air cleaning efficiency is improved.

Furthermore, the discharge electrode and the ground electrode are formed on the upper and lower surfaces of the insulating dielectric body, which is composed of a single sheet. Consequently, the structure of the surface discharge type air cleaning device is simplified, and manufacturing costs of the surface discharge type air cleaning device are reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A surface discharge air cleaning device comprising:
   an insulating dielectric body formed in the shape of a sheet;
   a discharge electrode formed at the upper surface of the insulating dielectric body; and
   a ground electrode formed at the lower surface of the insulating dielectric body, wherein
   the discharge electrode is formed of a closed pattern having a predetermined area on the upper surface of the insulating dielectric body, and
   the discharge electrode has at least one non-pattern part disposed in a part where the pattern is formed, the electrode being not formed at the at least one non-pattern part.

2. The air cleaning device as set forth in claim 1, wherein the pattern of the discharge electrode is formed in the shape of a rectangular frame.

3. The air cleaning device as set forth in claim 1, wherein the ground electrode is formed of a single rectangular pattern.

4. The air cleaning device as set forth in claim 1, wherein the discharge electrode and the ground electrode are formed in the shape of a rectangular frame, and the frame area of the pattern of the discharge electrode is greater than that of the pattern of the ground electrode.

5. The air cleaning device as set forth in claim 1, wherein the at least one non-pattern part comprises a plurality of non-pattern parts extending in the longitudinal direction of the pattern of the discharge electrode while being arranged in parallel with one another.

6. The air cleaning device as set forth in claim 5, wherein each of the non-pattern parts comprises: a linear part extending in the longitudinal direction of the pattern of the discharge electrode; and a plurality of circular parts formed on the linear part at a predetermined interval, the diameter of each of the circular parts being greater than the width of the linear part.

7. The air cleaning device as set forth in claim 1, wherein the discharge electrode has a plurality of pointed ends, which are protruded from opposite sides of the pattern part about the non-pattern part toward each other.

8. The air cleaning device as set forth in claim 7, wherein the pointed ends are formed in the shape of a triangle and uniformly protruded at a predetermined interval.

9. The air cleaning device as set forth in claim 1, further comprising: protective films applied to the upper and lower surfaces of the insulating dielectric body for protecting the discharge electrode and the ground electrode, respectively.

10. The air cleaning device as set forth in claim 9, wherein the discharge electrode and the ground electrode are provided with terminal parts, which are exposed outside the protective films and connected to an external circuit, respectively.

11. A surface discharge air cleaning device comprising:
    an insulating dielectric body formed in the shape of a sheet;
    a discharge electrode formed at the upper surface of the insulating dielectric body; and
    a ground electrode formed at the lower surface of the insulating dielectric body, wherein
    the discharge electrode is formed of a closed pattern having a predetermined area on the upper surface of the insulating dielectric body,
    the discharge electrode has at least one non-pattern part disposed in a part where the pattern is formed, the electrode being not formed at the non-pattern part, and
    the at least one non-pattern part comprises:
    a linear part extending in the longitudinal direction of the pattern of the discharge electrode; and
    a plurality of circular parts formed on the linear part at a predetermined interval, the diameter of each of the circular parts being greater than the width of the linear part.

12. The air cleaning device as set forth in claim 11, wherein the pattern of the discharge electrode is formed in the shape of a rectangular frame.

13. The air cleaning device as set forth in claim 11, wherein the ground electrode is formed of a single rectangular pattern.

14. The air cleaning device as set forth in claim 11, wherein the discharge electrode and the ground electrode are formed in the shape of a rectangular frame, and the frame area of the pattern of the discharge electrode is greater than that of the pattern of the ground electrode.

15. The air cleaning device as set forth in claim 11, further comprising: protective films applied to the upper and lower surfaces of the insulating dielectric body for protecting the discharge electrode and the ground electrode, respectively.

16. A surface discharge air cleaning device comprising:
    an insulating dielectric body formed in the shape of a sheet;
    a discharge electrode formed at the upper surface of the insulating dielectric body; and
    a ground electrode formed at the lower surface of the insulating dielectric body, wherein
    the discharge electrode is formed of a closed pattern having a predetermined area on the upper surface of the insulating dielectric body, the discharge electrode has at least one non-pattern part disposed in a part where the pattern is formed, the electrode being not formed at the non-pattern part, and the discharge electrode has a plurality of pointed ends, which are protruded from opposite sides of the pattern part about the non-pattern part toward each other.

17. The air cleaning device as set forth in claim 16, wherein the pattern of the discharge electrode is formed in the shape of a rectangular frame.

18. The air cleaning device as set forth in claim 16, wherein the ground electrode is formed of a single rectangular pattern.

19. The air cleaning device as set forth in claim 16, wherein the discharge electrode and the ground electrode are formed in the shape of a rectangular frame, and the frame area of the pattern of the discharge electrode is greater than that of the pattern of the ground electrode.

20. The air cleaning device as set forth in claim 16, further comprising: protective films applied to the upper and lower surfaces of the insulating dielectric body for protecting the discharge electrode and the ground electrode, respectively.

* * * * *